United States Patent
Gloeckler et al.

(10) Patent No.: US 7,854,448 B2
(45) Date of Patent: Dec. 21, 2010

(54) AIRBAG ARRANGEMENT

(75) Inventors: Oliver Gloeckler, Nersingen (DE); Georg Rasch, Bühl (DE); Heinrich Einsiedel, Ulm (DE); Ralf Passmann, Düsseldorf (DE)

(73) Assignees: Takata-Petri AG, Aschaffenburg (DE); Bayerische Motoren Werke AG, Munich (DE)

( * ) Notice: Subject to any disclaimer, the term of this patent is extended or adjusted under 35 U.S.C. 154(b) by 0 days.

(21) Appl. No.: 12/285,018

(22) Filed: Sep. 26, 2008

(65) Prior Publication Data
US 2009/0102169 A1    Apr. 23, 2009

Related U.S. Application Data

(63) Continuation of application No. PCT/EP2007/052131, filed on Mar. 7, 2007.

(30) Foreign Application Priority Data
Mar. 27, 2006    (DE) ................... 20 2006 005 317 U

(51) Int. Cl.
*B60R 21/213*    (2006.01)
(52) U.S. Cl. ................. 280/730.2; 280/728.2
(58) Field of Classification Search ............. 280/730.2, 280/728.2
See application file for complete search history.

(56) References Cited

U.S. PATENT DOCUMENTS

| | | | |
|---|---|---|---|
| 5,470,103 A * | 11/1995 | Vaillancourt et al. | 280/730.1 |
| 6,123,355 A * | 9/2000 | Sutherland | 280/728.2 |
| 6,361,068 B1 | 3/2002 | Stein et al. | |
| 6,428,037 B1 | 8/2002 | Bakhsh et al. | |
| 6,457,740 B1 * | 10/2002 | Vaidyaraman et al. | 280/730.2 |
| 6,688,641 B2 * | 2/2004 | Dominissini | 280/730.2 |
| 6,913,280 B2 * | 7/2005 | Dominissini et al. | 280/728.2 |
| 7,134,683 B2 * | 11/2006 | Bendig et al. | 280/730.1 |
| 7,393,006 B2 * | 7/2008 | Ohrvall et al. | 280/730.2 |
| 2001/0052693 A1 * | 12/2001 | Mueller | 280/730.2 |
| 2002/0056974 A1 * | 5/2002 | Webert | 280/728.2 |
| 2004/0239083 A1 * | 12/2004 | Mori et al. | 280/730.1 |
| 2005/0206137 A1 * | 9/2005 | Takimoto | 280/729 |

(Continued)

FOREIGN PATENT DOCUMENTS

DE    20 2004 019 790 U1    2/2005

(Continued)

*Primary Examiner*—Eric Culbreth
*Assistant Examiner*—Karen Jane J Amores
(74) *Attorney, Agent, or Firm*—Foley & Lardner LLP

(57) ABSTRACT

An airbag arrangement for restraining an occupant of a motor vehicle. The vehicle roof is bounded by lateral roof edge regions extending parallel to the longitudinal axis of the vehicle and also bounded by a front window cross member extending transversely with respect to the longitudinal axis of the vehicle. A first section of the folded-up airbag can be arranged along a lateral roof edge region. A second section can be angled away from the first section transversely with respect to the longitudinal axis of the vehicle, wherein the second section of the airbag is arranged along a longitudinal side of the front window cross member. The airbag can be disconnected from the vehicle body in the region of the second section or be connected releasably thereto when the airbag is deployed. Therefore, when the airbag is deployed, the entire second section can be deployed freely.

13 Claims, 6 Drawing Sheets

U.S. PATENT DOCUMENTS

| | | | |
|---|---|---|---|
| 2006/0108776 A1* | 5/2006 | Bradbum | 280/730.2 |
| 2007/0241544 A1 | 10/2007 | Ohrvall et al. | |
| 2009/0102169 A1* | 4/2009 | Gloeckler et al. | 280/730.2 |

FOREIGN PATENT DOCUMENTS

| | | | |
|---|---|---|---|
| DE | 20 2004 019790 | * | 3/2005 |
| EP | 1 110 825 A1 | | 6/2001 |
| EP | 1 541 426 A1 | | 6/2005 |
| GB | 2 323 340 A | | 9/1998 |
| WO | WO 00/41919 | | 7/2000 |

* cited by examiner

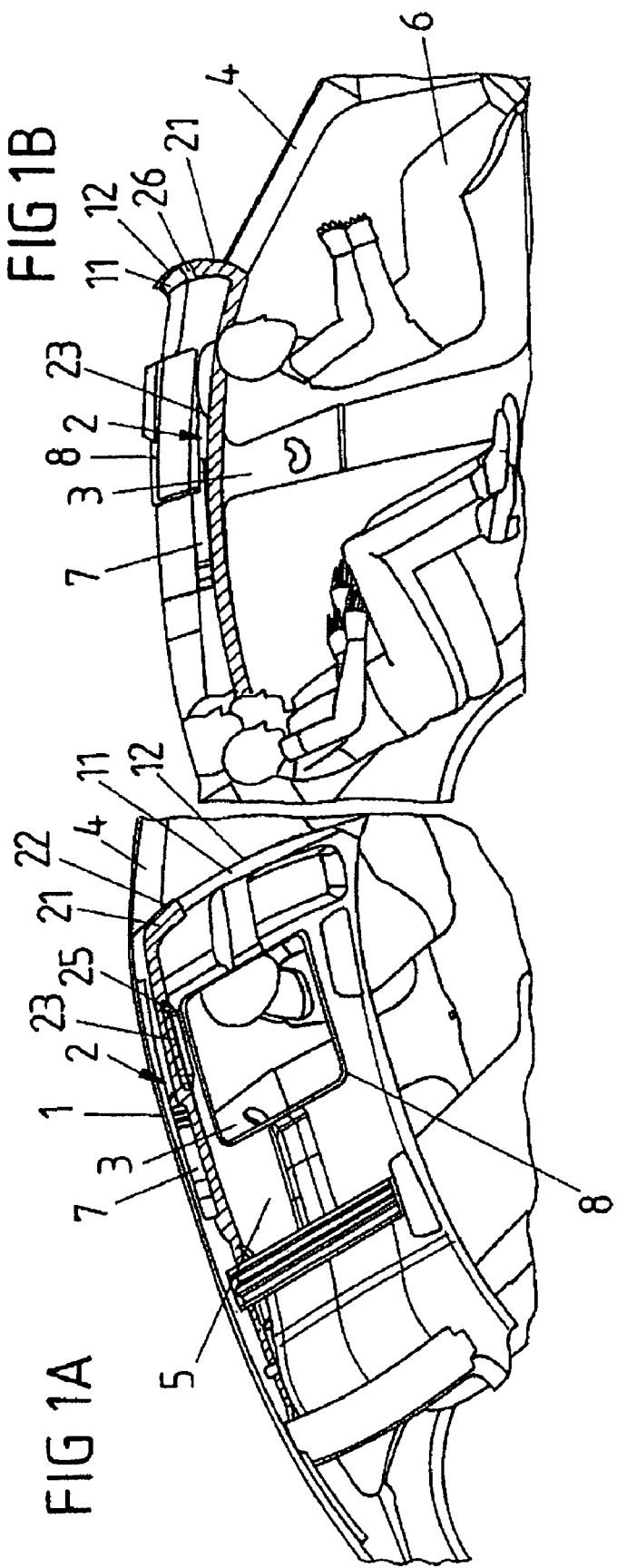
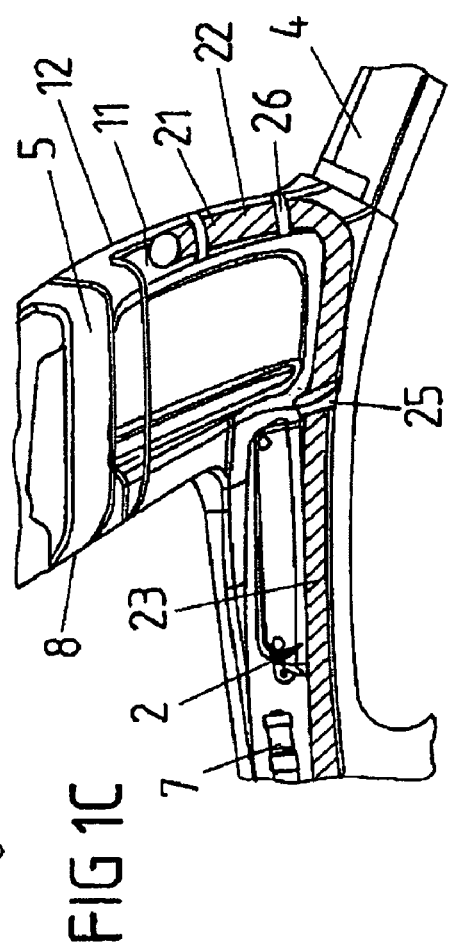

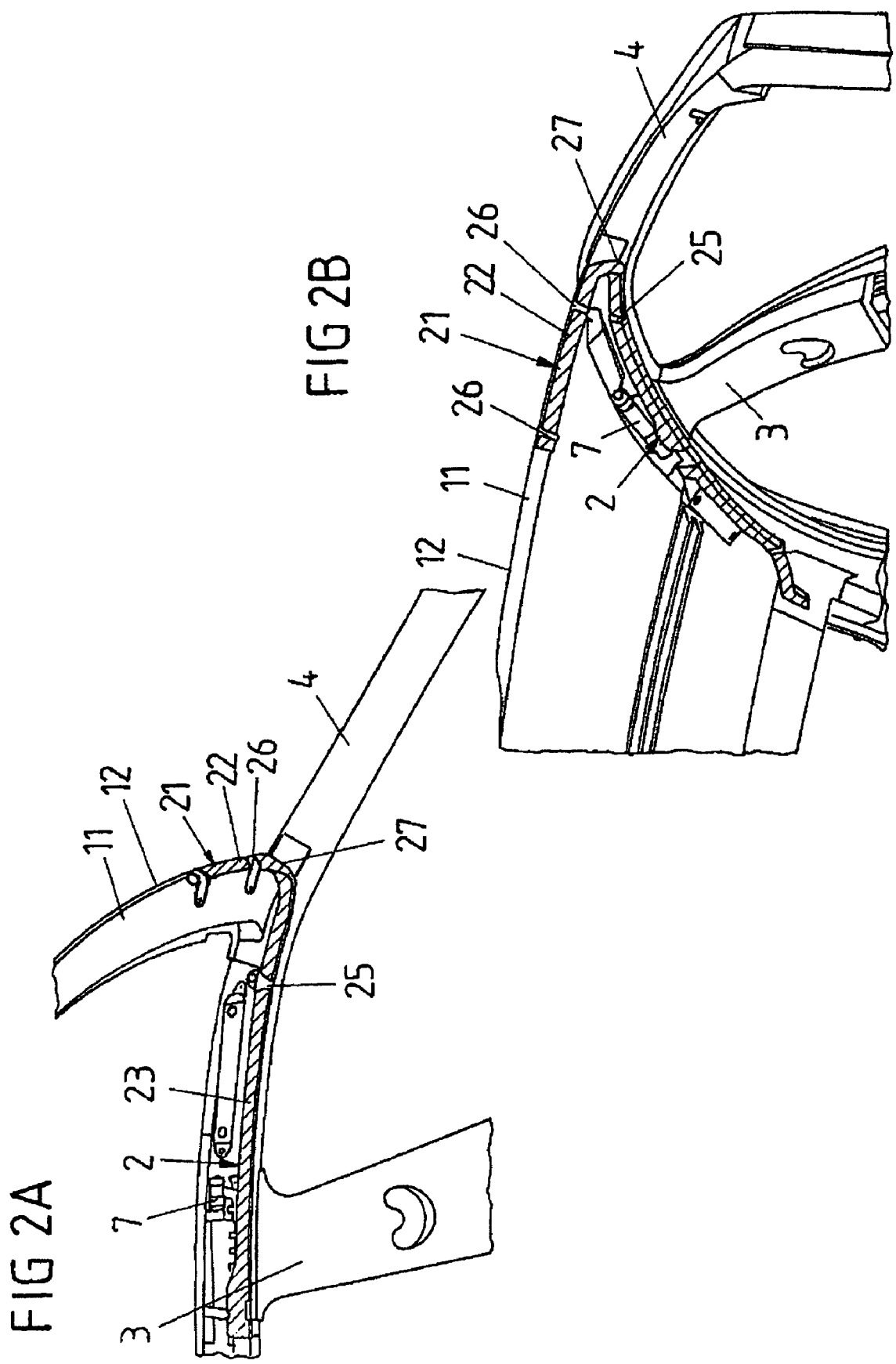

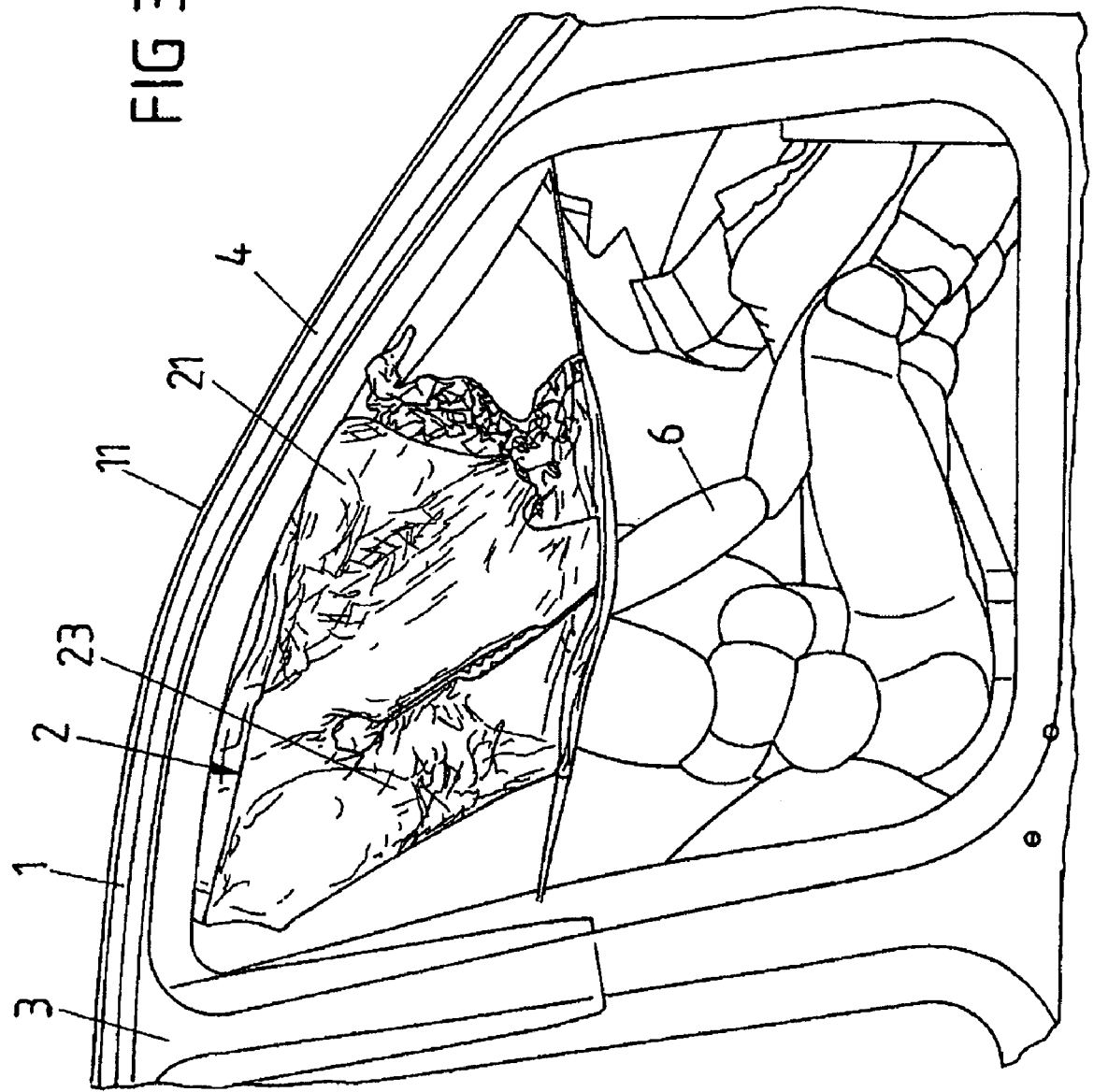

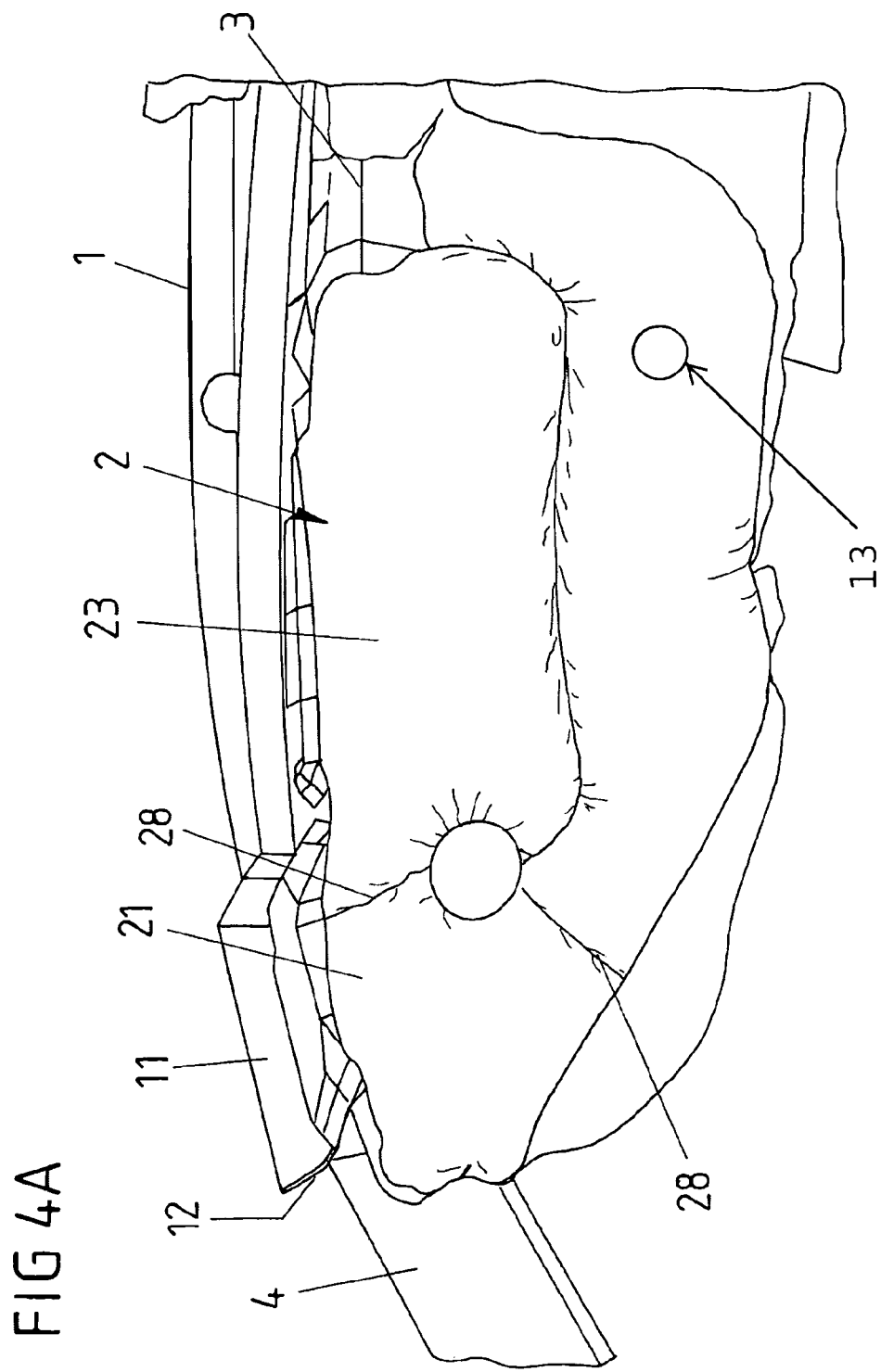

AIRBAG ARRANGEMENT

CROSS-REFERENCE TO RELATED PATENT APPLICATIONS

This application is a Continuation of International Patent Application No. PCT/EP2007/052131, filed Mar. 7, 2007, which was published in German as WO 2007/110302 and is incorporated herein by reference in its entirety.

BACKGROUND

The present disclosure relates generally to the field of an airbag arrangement for a restraint device for a motor vehicle.

SUMMARY

One disclosed embodiment relates to an airbag arrangement for a restraint device for an occupant of a motor vehicle that includes a longitudinal axis and a vehicle roof. The vehicle roof is bounded by lateral roof edge regions extending parallel to the longitudinal axis of the vehicle and also bounded by a front window cross member extending transversely with respect to the longitudinal axis of the vehicle. The airbag can be deployed by means of inflation in order to protect a motor vehicle occupant. In the folded-up state, the airbag includes a first section and a second section. The first section of the folded-up airbag can be arranged along a lateral roof edge region. The second section can be angled away from the first section transversely with respect to the longitudinal axis of the vehicle, wherein the second section of the airbag is arranged along a longitudinal side of the front window cross member. The longitudinal side of the front window cross member, when viewed along the forward direction of travel running parallel to the longitudinal axis of the vehicle, forms a front end of the front window cross member. The airbag can be disconnected from the vehicle body in the region of the second section or be connected releasably thereto when the airbag is deployed. Therefore, when the airbag is deployed, the entire second section can be deployed freely.

Another embodiment of the disclosure relates to an airbag arrangement for a restraint device for an occupant of a motor vehicle that includes a longitudinal axis and a vehicle roof. The vehicle roof is bounded by lateral roof edge regions extending parallel to the longitudinal axis of the vehicle. The vehicle roof is also bounded by a front window cross member extending transversely with respect to the longitudinal axis of the vehicle. The airbag is capable of being deployed by inflation in order to protect a motor vehicle occupant. In the folded-up state, the airbag includes a first section and a second section. The first section of the folded-up airbag is arranged along a lateral roof edge region. The second section is arranged angled away from the first section transversely with respect to the longitudinal axis of the vehicle. Therefore, the second section of the airbag bends away from the first section in the region of a vehicle body pillar extending from a central section of the lateral roof edge region in the direction of the vehicle floor. The second section of the airbag being designed and arranged so as to fold down, when deployed, onto the vehicle body pillar.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 1a-1c are schematic views of a vehicle body with a folded-up airbag according to an exemplary embodiment.

FIGS. 2a-2b show an enlarged illustration of an airbag arranged on a vehicle body according to an exemplary embodiment.

FIG. 3 is a side view of a deployed airbag according to an exemplary embodiment.

FIGS. 4a-4c show enlarged views of a deployed airbag, according to an exemplary embodiment.

DETAILED DESCRIPTION

Figure 4B:
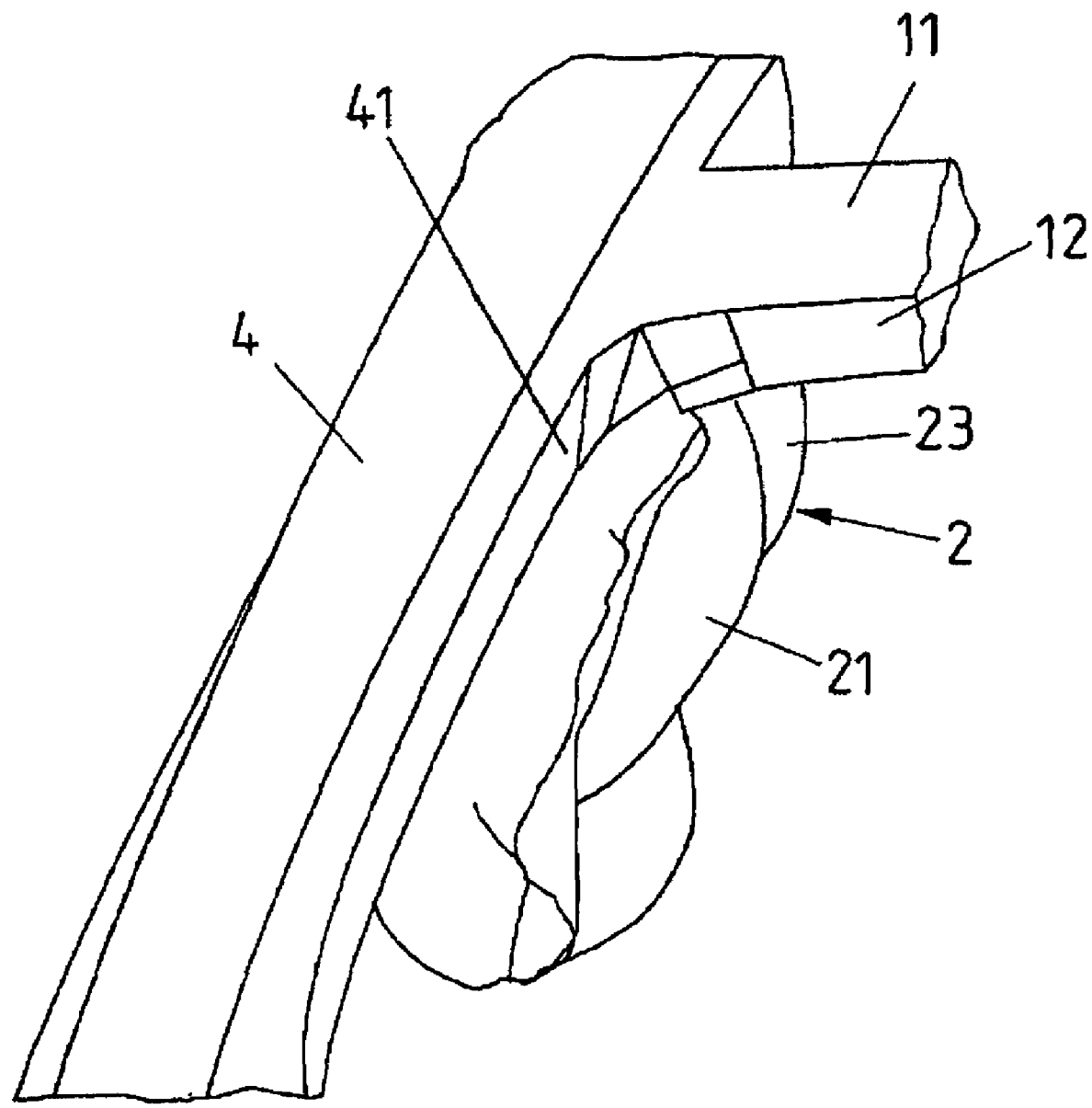
Figure 4C:
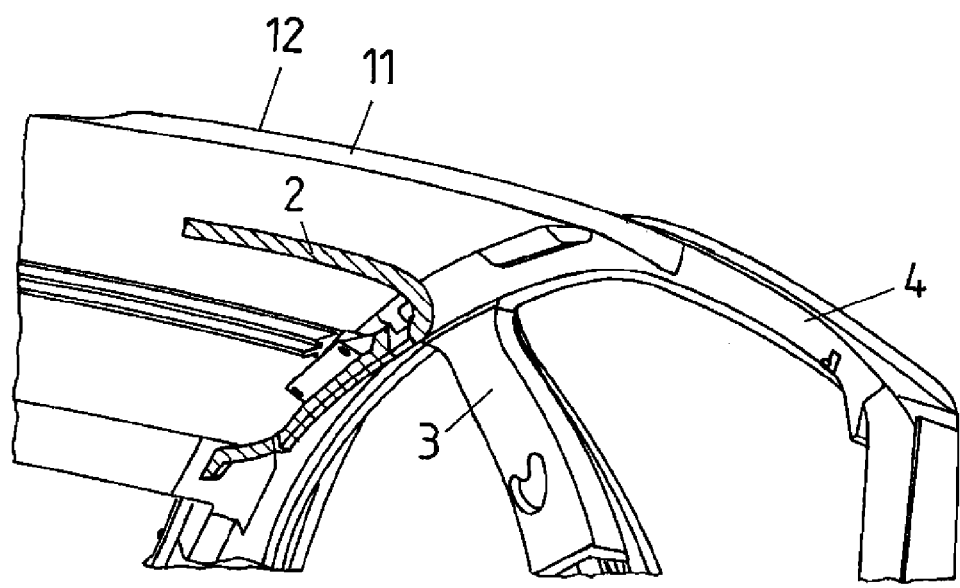

In the event of an accident due to an oblique impact, it is necessary to protect a motor vehicle occupant from impacting a front pillar of the vehicle. Therefore, a curtain-type airbag similar to that disclosed in patent document no. EP 11 10 825 A1 may be used, which is herein incorporated by reference in its entirety. In the folded-up state, the curtain-type airbag extends with one section along a side strut of the roof frame of the vehicle body. Further, an additional section may extend transversely with respect to the axis of the vehicle along a front window cross member above the windshield. When triggered, the curtain-type airbag deploys downward, covering both a side window region and a section of the vehicle A-pillar in an L-shaped manner.

Furthermore, an L-shaped curtain-type airbag similar to that disclosed in patent document no. DE 20 2004 019 790 U1 may be used, which is herein incorporated by reference in its entirety. When folded up, a section of the curtain-type airbag extends transversely with respect to the longitudinal axis of the vehicle. The free end of the section is placed onto a section of the vehicle A-pillar when the airbag is deployed. Additionally, the section of the airbag that extends transversely with respect to the longitudinal axis of the vehicle in the folded-up state is fastened on a rear side of the window cross member to a means of fastening a sun visor.

One problem addressed by the structure disclosed in the present application is to improve the protective effect of an airbag arrangement including an airbag that is L-shaped when in a folded-up state. Therefore, an airbag arrangement is provided for a restraint device for an occupant of a motor vehicle that includes a longitudinal axis and vehicle roof. The vehicle roof can be bounded by lateral roof edge regions extending parallel to the longitudinal axis of the vehicle. The vehicle roof can also be bounded by a front and rear window cross member extending transversely with respect to the longitudinal axis of the vehicle.

The airbag can be deployed by means of inflation in order to protect a motor vehicle occupant. Further, in the folded-up state the airbag includes a first and a second section. The first section can be arranged along a lateral roof edge region. The second section can be arranged angled away from the first section transversely with respect to the longitudinal axis of the vehicle. The second section of the airbag can additionally be arranged along a longitudinal side of the front window cross member. Furthermore, the longitudinal side of the front window cross member, when viewed along the forward direction of travel running parallel to the longitudinal axis of the vehicle, forms a front end of the front window cross member.

The positioning of the second airbag section enables simpler installation of the section than in the case of the known systems. Furthermore, the front longitudinal side of the window cross member is more easily accessible during installation. As a result, the angled section of the airbag, and therefore the airbag as a whole, can be easily fitted.

It should be appreciated that, although the second section can be arranged along a front longitudinal side of the window cross member, the installation does not have to take place at a forwardly facing end side of the window cross member. The second section may also be fitted, for example, in a front section of a side of the window cross member that faces downward.

More particularly, the second section of the airbag is designed and arranged to fold down when deployed onto a vehicle body pillar. The pillar can run from a front end of the lateral roof edge region (obliquely) in the direction of the vehicle floor. Additionally, the pillar can be the A-pillar of a vehicle body.

When the airbag is triggered, one section can fold down onto the A-pillar of the vehicle. Therefore, a motor vehicle occupant can be effectively protected even in the event of an oblique impact. Further, compared to airbags that are integrated directly into an A-pillar or arranged on an A-pillar, the provision of a section that only folds down when triggered affords the advantage of requiring a smaller airbag volume. Thus, smaller gas generators can be used to inflate the airbag. Furthermore, no special functional cladding is required for the A-pillar.

According to an exemplary embodiment, when the airbag is deployed, the entire second section extending from a bending point to a free end opposite the bending point folds down onto the pillar of the vehicle body. Thus, the second section of the airbag can be freely deployed, requiring no fastening mechanism between the bending point and the free end of the second section. Therefore, the airbag is either not connected at all to the vehicle body or is detachably connected in the region of the second section.

Furthermore, since the second section of the airbag folds downward in the event of triggering, a large region of the A-pillar can be covered. Thus, a motor vehicle occupant who is accelerated onto the A-pillar by an accident can be effectively protected.

According to a preferred exemplary embodiment, the second section can be detachably connected to the window cross member directly or another part of the vehicle body. Such a connection must be released when the airbag is deployed so that the second section, that is arranged transversely with respect to the longitudinal axis of the vehicle, can be deployed forward onto the vehicle pillar. It should be appreciated that it is not necessary for the second section to be connected to the vehicle body at all. For example, the second section can be arranged so that the second section rests on a roof lining attached to the roof frame of the vehicle body.

Additionally, a releasable connection of the airbag can be produced. For example, a clip connection can be used. Furthermore, fastening elements with predetermined breaking points are also suitable, such that the predetermined breaking points break under the deployment pressure of the airbag. As a result, the breaking points may not obstruct deployment and folding down of the second section of the airbag.

According to an exemplary embodiment, the second section of the folded-up airbag can be surrounded by an airbag covering that is connected to the vehicle body in the region of the window cross member. The airbag covering can be connected to the window cross member directly or via another part. The connection for the airbag covering can include special fastening tabs. According to the present embodiment, only the airbag covering is connected to the vehicle body via the window cross member. Thus, the airbag is not connected to the vehicle body. There, the airbag can deploy unhindered and can fold downward when the airbag is triggered.

According to an exemplary embodiment, the first section of the folded-up airbag can be fastened to the vehicle body in the region of the lateral roof edge region such that, when the airbag is inflated, it remains fastened by an upper section to the roof edge region. Thus, the actual fastening of the airbag to the vehicle body takes place only via the section of the airbag that extends along the axis of the vehicle. Further, the first section of the airbag may include fastening tabs that are fastened via special fastening elements (e.g. fastening clips) to the lateral roof edge region of the vehicle body or to another part of the vehicle body.

When triggered, the entire fitted airbag is deployed downward in a curtain-like manner, with the deployed airbag being secured at its upper edge along the lateral roof edge. For example, via the aforementioned fastening clips. Only the first section of the airbag, that extends along the lateral roof edge region, is permanently connected to the vehicle body. The second section, that extends along the upper window cross member transversely with respect to the axis of the vehicle, is freely moveable and folds downward when the airbag is inflated.

The first section of the airbag, that extends along the axis of the vehicle, can be configured in a manner customary for curtain-type airbags. For example, the airbag may include a plurality of chambers that can be filled at different pressures. As a result, adaptation of the internal pressure of the airbag to different body regions of a motor vehicle occupant would be possible.

A ventilation opening 13, such as schematically shown in FIG. 4A, can be included for the adaptation of the internal pressure of the various chambers of the airbag. However, devices of this type for the adaptation of the internal pressure of the airbag are known and therefore not discussed.

In another exemplary embodiment, the invention relates to an airbag arrangement including an airbag. The airbag, when folded up, extends with a first section along a lateral roof edge region. A second section of the airbag can be arranged such that the second section is angled away from the first section transversely with respect to the longitudinal axis of the vehicle. The second section bends away from the first section in the region of a vehicle body pillar that extends from a central section of the lateral roof edge region in the direction of the vehicle floor.

More particularly, the second section of the airbag is designed and arranged to fold down, when deployed, onto the pillar. The pillar can include a vehicle B-pillar or other type of pillar. The aforementioned airbag arrangement cushions the B-pillar of the vehicle a section of an airbag that folds down onto it. Thus, a rear motor vehicle occupant can be effectively protected during an oblique impact of the vehicle.

The second section of the airbag, that section extends transversely with respect to the longitudinal axis of the vehicle, can be detachably fastened. For example, the second section of the airbag can be fastened to a vehicle roof section running transversely with respect to the axis of the vehicle in the region of the B-pillar. Additionally, the second section has to be able to be released from a fastening and folded down forward when deployed.

Referring to FIG. 1, a view from above a vehicle body that includes a roof lining 5 is shown, according to an exemplary embodiment. Roof lining 5 is attached to a roof frame. Further, a cutout 8 for a roof window opens up a view of the vehicle interior. The vehicle body additionally includes a roof frame with a lateral roof strut 1 as the lateral roof edge region. Lateral roof strut 1 is forwardly joined by a vehicle A-pillar 4. Vehicle A-pillar 4 extends obliquely downward in the direction of the vehicle floor. In the region of the attachment of the vehicle A-pillar 4 to the lateral roof strut 1, a front window cross member 11 is connected to the lateral roof strut 1. Front window cross member 11 runs transversely with respect to the longitudinal axis of the vehicle and has a longitudinal side 12. The roof lining 5 is attached to the roof frame.

Additionally, a folded L-shaped curtain-type airbag 2 is arranged on the roof frame of the vehicle body. The folded curtain-type airbag 2 extends with a first section 23 from a vehicle B-pillar 3 in the direction of the vehicle A-pillar 4. In the region of attachment of front window cross member 11 to the lateral roof strut 1, the curtain-type airbag 2 bends and extends with a second section 21 along a forwardly facing longitudinal side of front window cross member 11. To inflate the curtain-type airbag 2, a gas generator 7 that is connected to curtain-type airbag 2 in the region of the vehicle B-pillar 3 is arranged on the lateral roof strut 1.

When triggered, curtain-type airbag 2 can deploy downward, and will firstly covering a side window region of the vehicle with first section 23. Further, the second section of curtain-type airbag 2 can be designed and arranged to deploy downward when curtain-type airbag 2 is inflated. Additionally, curtain-type airbag 2 can be designed and arranged to fold down and forward, thereby covering a section of the vehicle A-pillar that is level with the head of motor vehicle occupant 6. The folding-down of the second section protects the head region of a vehicle occupant in the event of an impact against the A-pillar. As a result, motor vehicle occupant 6 can be effectively protected in the event of an oblique impact accident.

Curtain-type airbag 2 can be surrounded by airbag covering 22 that, when triggered, releases the deploying airbag (e.g. tears) such that the deployment of the airbag is not obstructed. First section 23 of curtain-type airbag 2 can be connected to lateral roof strut 1 of the vehicle body via lateral fastening elements 25 on curtain-type airbag 2. When curtain-type airbag 2 is triggered, first section 23 can deploy downward in a curtain-like manner with the upper region of first section 23 remaining connected to lateral roof strut 1. The fastening can take place via fastening tabs (not illustrated) formed directly on the airbag, and not via airbag covering 22.

By contrast, the second section 21 of the curtain-type airbag 2 is fastened to the window cross member 11 via releasable fastening elements 26, for example in the form of releasable fastening clips. In this case, the airbag covering 22, rather than the section 21 of the airbag itself, is connected to the window cross member 11; this ensures that it can fold down unobstructed in the direction of the A-pillar 4.

When triggered, the connection of second section 21 to window cross member 11 can be released by the deployment pressure of the airbag such that, after the airbag is triggered, second section 21 is not connected to window cross member 11. As a result, second section 21 can first deploy downward in a curtain-like manner. Additionally, second section 21 can fold forward onto vehicle A-pillar 4. Therefore, the region between the B- and A-pillars of the vehicle and also A-pillar 4 are protected by curtain-type airbag 2.

FIG. 1b shows the arrangement of FIG. 1a in an oblique view from below, according to an exemplary embodiment.

FIG. 1c is a view of the vehicle interior, according to an exemplary embodiment. Section 21 of curtain-type airbag 2 can be seen. Section 21 extends along front window cross member 11. Curtain-type airbag 2 and section 21 extend above vehicle headlining 5. Further, section 21 of the airbag that is arranged along window cross member 11 does not rest on the roof lining 5. Instead, section 21 can be connected to the vehicle body via detachable fastening elements 26 in the region of window cross member 11.

FIG. 2a shows a folded-up, L-shaped curtain-type airbag 2 in an enlarged illustration, according to an exemplary embodiment. The vehicle headlining illustrated in FIGS. 1a-1c has been omitted. It can clearly be seen that section 21 of curtain-type airbag 2 bends away from first section 23. First section 23 extends along the direction of the vehicle at a bending point 27 and is arranged along front window cross member 11.

Second section 21 of curtain-type airbag 2 can be detachably connected again via airbag covering 22 to window cross member 11. Section 21 can be detachably fastened via clip-like fastening elements 26 that include a predetermined breaking point. When triggered, connecting elements 26 can break open along the predetermined breaking points. As a result, section 21 of curtain-type airbag 2 can be deployed without obstruction and can fold down in the direction of vehicle A-pillar 4.

FIG. 2b shows the arrangement of FIG. 2a in an oblique view from the front, according to an exemplary embodiment. Curtain-type airbag 2 is shown bending with a section 21 along window cross member 11. Section 21 can be fastened to window cross member 11 by detachable fastening elements 26.

FIG. 3 shows a deployed curtain-type airbag 2, according to an exemplary embodiment. First section 23, that extends along a lateral roof strut 1 of the vehicle roof, has been deployed downward in a curtain-like manner. A second section 21 of curtain-type airbag 2, that was originally arranged in the window cross member 11, has been entirely folded down forward such that second section 21 rests on a vehicle A-pillar 4 of the vehicle body and partially covers the pillar. As a result, an impact of motor vehicle occupant 6 against vehicle A-pillar 4 is cushioned by the folded-down second section 21 of curtain-type airbag 2. Therefore, motor vehicle occupant 6 is protected by the forwardly folded second section 21 of airbag 2 even in the event of an oblique impact.

FIGS. 4a and 4b show further views of a deployed curtain-type airbag, according to an exemplary embodiment. FIG. 4a shows a view of a deployed curtain-type airbag 2 from the vehicle interior. First section 23 of curtain-type airbag 2 has been deployed downward in the region between vehicle B-pillar 3 and vehicle A-pillar 4. Therefore, a side window of the vehicle is substantially covered. Additionally, second section 21 of curtain-type airbag 2 is folded over forward onto a section of vehicle A-pillar 4. Therefore, a motor vehicle occupant (not illustrated) can be protected in the event of an impact on the pillar.

In the folded state, section 21 of airbag 2 can be bent in the direction of front window cross member 11 along folding lines 28. When curtain-type airbag 2 is inflated, section 21 can fold down and forward along folding lines 28.

FIG. 4b shows a further view of the deployed curtain-type airbag 2 of FIG. 4a, according to an exemplary embodiment. As shown in FIG. 4b, deployed airbag 2 is viewed from the front, and to a certain extent through the vehicle windshield. Second section 21 of curtain-type airbag 2 is arranged in the folded state along the window cross member 11. Furthermore, second section 21 has been deployed onto a section of a vehicle A-pillar 4, thereby resting on an inner cladding 41 of vehicle A-pillar 4.

The priority application, German Patent Application No. 20 2006 005 317.4 Mar. 27, 2006, including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by present application are to be included as further embodiments of the present application. The scope of the present application is to be defined as set forth in the following claims.

What is claimed is:

1. An airbag arrangement for restraining an occupant of a motor vehicle, wherein the motor vehicle has a longitudinal axis and a vehicle roof and wherein the vehicle roof is bounded by lateral roof edge regions extending parallel to the longitudinal axis of the vehicle and by a front window cross member extending transversely with respect to the longitudinal axis of the vehicle, wherein the arrangement comprises:
an airbag configured to be inflated in order to protect the occupant,
wherein the airbag is folded prior to inflation, the folded airbag including a first section and a second section, and
wherein the first section of the folded airbag is arranged along a lateral roof edge region and the second section is arranged angled away from the first section transversely with respect to the longitudinal axis of the vehicle,
wherein the second section of the airbag is arranged along the front window cross member,
wherein the second section of the airbag extends from a bending point to a free end lying opposite to the bending point and no fastening means for providing permanent fastening are fitted between the bending point and the free end of the second section so that when the airbag is deployed, the entire second section can be deployed freely,
wherein the second section of the airbag is designed and arranged so as to fold down, when deployed, onto a vehicle body pillar, the pillar running from a front end of the lateral roof edge region in the direction of the vehicle floor, and
wherein the second section is arranged along a longitudinal side of the front window cross member, which longitudinal side —as viewed along the forward direction of travel running parallel to the longitudinal axis of the vehicle —forms a front end of the front window cross member.

2. The airbag arrangement of claim 1, wherein the pillar is an A-pillar of the vehicle body.

3. The airbag arrangement of claim 1, wherein the second section is fastened to the front window cross member, the fastening taking place exclusively via a releasable fastening mechanism which releases the second section from the window cross member when the airbag is deployed.

4. The airbag arrangement of claim 1, wherein the second section is surrounded by an airbag covering which is fastened to the window cross member.

5. The airbag arrangement of claim 4, wherein the airbag covering is configured to tear open when the airbag deploys.

6. The airbag arrangement of claim 4, wherein the airbag covering is fastened to the window cross member with a releasable fastening mechanism and is released from the window cross member when the airbag is deployed.

7. The airbag arrangement of claim 1, wherein the second section is arranged above a roof lining provided on the vehicle roof.

8. The airbag arrangement of claim 1, wherein the first section of the airbag is fastened to a lateral roof edge region of the vehicle roof; and wherein the first section deploys downward when the airbag is inflated, and remains connected by an upper section to the roof edge region.

9. The airbag arrangement of claim 8, wherein the first section of the airbag is fastened to the lateral roof edge region via fastening tabs of the airbag.

10. The airbag arrangement of claim 1, wherein the airbag has a plurality of chambers.

11. The airbag arrangement of claim 1, wherein the airbag has a ventilation opening for the adaptation of the internal pressure of the airbag.

12. An airbag arrangement for restraining an occupant of a motor vehicle, wherein the motor vehicle has a longitudinal axis and a vehicle roof and wherein the vehicle roof is bounded by lateral roof edge regions extending parallel to the longitudinal axis of the vehicle and by a front window cross member extending transversely with respect to the longitudinal axis of the vehicle, wherein the arrangement comprises:
an airbag configured to be inflated in order to protect the occupant,
wherein the airbag is folded prior to inflation, the folded airbag including a first section and a second section,
wherein the first section of the folded airbag is arranged along a lateral roof edge region and the second section is arranged angled away from the first section transversely with respect to the longitudinal axis of the vehicle,
wherein the second section of the airbag is arranged along the front window cross member,
wherein the second section of the airbag extends from a bending point to a free end lying opposite to the bending point and no fastening means for providing permanent fastening are fitted between the bending point and the free end of the second section so that when the airbag is deployed, the entire second section can be deployed freely,
wherein the second section is fastened to the front window cross member, the fastening taking place exclusively via a releasable fastening mechanism which releases the second section from the window cross member when the airbag is deployed, and
wherein the second section is arranged along a longitudinal side of the front window cross member, which longitudinal side —as viewed along the forward direction of travel running parallel to the longitudinal axis of the vehicle —forms a front end of the front window cross member.

13. An airbag arrangement for restraining an occupant of a motor vehicle, wherein the motor vehicle has a longitudinal axis and a vehicle roof and wherein the vehicle roof is bounded by lateral roof edge regions extending parallel to the longitudinal axis of the vehicle and by a front window cross member extending transversely with respect to the longitudinal axis of the vehicle, wherein the arrangement comprises:
an airbag configured to be inflated in order to protect the occupant,
wherein the airbag is folded prior to inflation, the folded airbag including a first section and a second section,
wherein the first section of the folded airbag is arranged along a lateral roof edge region and the second section is arranged angled away from the first section transversely with respect to the longitudinal axis of the vehicle, wherein the second section of the airbag is arranged along the front window cross member, wherein the second section of the airbag extends from a bending point to a free end lying opposite to the bending point and no fastening means for providing permanent fastening are fitted between the bending point and the free end of the second section so that when the airbag is deployed, the entire second section can be deployed freely, wherein the second section is surrounded by an airbag covering which is fastened to the window cross member, wherein the airbag covering is fastened to the window cross member with a releasable fastening mechanism and is released from the window cross member when the airbag is deployed, and wherein the second section is arranged along a longitudinal side of the front window cross member, which longitudinal side —as viewed along the forward direction of travel running parallel to the longitudinal axis of the vehicle —forms a front end of the front window cross member.

* * * * *